US012399025B2

(12) United States Patent
Brewington et al.

(10) Patent No.: US 12,399,025 B2
(45) Date of Patent: Aug. 26, 2025

(54) EXPLICIT SIGNAGE VISIBILITY CUES IN DRIVING NAVIGATION

(71) Applicant: GOOGLE LLC, Mountain View, CA (US)

(72) Inventors: Brian Brewington, Mountain View, CA (US); Matt Strosnick, Mountain View, CA (US)

(73) Assignee: Google LLC, Mountain View, CA (US)

( * ) Notice: Subject to any disclaimer, the term of this patent is extended or adjusted under 35 U.S.C. 154(b) by 490 days.

(21) Appl. No.: 17/438,295

(22) PCT Filed: Jan. 13, 2021

(86) PCT No.: PCT/US2021/013250
§ 371 (c)(1),
(2) Date: Sep. 10, 2021

(87) PCT Pub. No.: WO2022/154786
PCT Pub. Date: Jul. 21, 2022

(65) Prior Publication Data
US 2023/0175854 A1 Jun. 8, 2023

(51) Int. Cl.
G01C 21/36 (2006.01)
G06V 10/764 (2022.01)

(52) U.S. Cl.
CPC ..... *G01C 21/3644* (2013.01); *G01C 21/3638* (2013.01); *G01C 21/3647* (2013.01); *G06V 10/764* (2022.01)

(58) Field of Classification Search
CPC ............ G01C 21/3644; G01C 21/3638; G01C 21/3647; G06V 10/764
See application file for complete search history.

(56) References Cited

U.S. PATENT DOCUMENTS 8,301,374 B2  10/2012  Surampudi et al.
8,548,725 B2  10/2013  Epshtein et al.
(Continued)

FOREIGN PATENT DOCUMENTS

JP    2005-249485    9/2005
JP    2014-185925    10/2014
(Continued)

OTHER PUBLICATIONS

International Search Report and Written Opinion for Application No. PCT/US2021/01250, dated Oct. 4, 2021.
(Continued)

*Primary Examiner* — Thomas E Worden
*Assistant Examiner* — Elizabeth Rose Neleski
(74) *Attorney, Agent, or Firm* — Lerner David LLP

(57) ABSTRACT

To provide navigation instructions with indications of visibility of visual aids during navigation, a computing device receives a request from a user for navigation directions from a starting location to a destination location, and obtains a set of navigation directions for traversing from the starting location to the destination location along a route in response to the request. For at least one maneuver, the computing device identifies a visual aid for assisting the user in identifying a location corresponding to the maneuver, determines an amount of visibility for the visual aid, and adjusts a navigation instruction in the set of navigation directions corresponding to the maneuver to include a description of the amount of visibility for the visual aid. The computing device provides the set of navigation directions including the adjusted navigation instruction for presentation to the user.

20 Claims, 7 Drawing Sheets

(56) References Cited

U.S. PATENT DOCUMENTS

| | | | |
|---|---|---|---|
| 8,848,983 B1 | 9/2014 | Brewington et al. | |
| 9,625,612 B2 | 4/2017 | Brewington et al. | |
| 9,696,719 B2 | 7/2017 | Aviel | |
| 10,126,141 B2* | 11/2018 | Golding | G01C 21/3644 |
| 2011/0098910 A1* | 4/2011 | Saarimaki | G01C 21/3644 |
| | | | 701/532 |
| 2015/0112593 A1* | 4/2015 | Kandangath | G01C 21/3644 |
| | | | 701/400 |
| 2017/0314954 A1 | 11/2017 | Golding et al. | |
| 2018/0136001 A1* | 5/2018 | Ishikawa | G06F 18/22 |
| 2021/0240762 A1* | 8/2021 | Mayster | G06F 16/587 |
| 2022/0349719 A1* | 11/2022 | Brewington | G01S 5/16 |

FOREIGN PATENT DOCUMENTS

| | | |
|---|---|---|
| JP | 6024328 B2 | 11/2016 |
| JP | 2020-30119 A | 2/2020 |
| WO | WO-2020/086051 A1 | 4/2020 |
| WO | WO-2020/106309 | 5/2020 |

OTHER PUBLICATIONS

Li et al., "Driver's Smart Advisory System Improves Driving Performance at Stop Sign Intersections," Journal of Traffic and Transportation Engineering (2017).

Notice of Reason for Rejection for Japanese Patent Application No. 2023-541339, mailing date of May 20, 2024.

Notice of Reason for Rejection for Japanese Patent Application No. 2023-541339, mailing date of Nov. 5, 2024.

* cited by examiner

200

| Visual Aid ID 202 | Location 204 | Orientation 206 | Size 208 | Appearance 210 | Name 212 | Occlusion 214 |
|---|---|---|---|---|---|---|
| 1 | Position: (41.342, -115.265) Height: 5 m | East | 4 m x 2 m | White Cursive Letters with Red Background | Walgreens Sign | 95 |
| 2 | Position: (33.983, -102.175) Height: 10 m | West | 3 m x 3 m | Red Letters with White, Brown, and Blue Background | Burger King Sign | 5 |
| 3 | Position: (38.102, -110.842) Height: 2 m | South | 0.5m x 0.1m | White Letters with Green Background | Main Street Sign | 70 |
| 4 | Position: (37.671, -123.637) Height: 2 m | East | 0.5m x 0.1m | White Letters with Green Background | State Street Sign | 8 |

FIG. 2

EXPLICIT SIGNAGE VISIBILITY CUES IN DRIVING NAVIGATION

FIELD OF THE DISCLOSURE

The present disclosure relates to navigation directions and, in particular, to providing descriptions of visibility of visual aids when directing users.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Systems that automatically route drivers between geographic locations generally utilize indications of distance, street names, building numbers, etc., to generate navigation directions based on the route. For example, these systems can provide to a driver such instructions as "proceed for one-fourth of a mile, then turn right onto Maple Street." However, it is difficult for drivers to accurately judge distance, nor is it always easy for drivers to see street signs. Moreover, there are geographic areas where street and road signage is poor.

To provide guidance to a driver that is more similar to what another person may say to the driver, it is possible to augment navigation directions with references to prominent objects along the route, such as visually salient buildings or billboards. These prominent objects along with street signs can be referred to as "visual aids." Thus, a system can generate such navigation directions as "in one fourth of a mile, you will see a McDonald's® restaurant on your right; make the next right turn onto Maple Street." To this end, an operator can enter descriptions and indications of locations (e.g., street addresses, coordinates) for visual aids, so that the system can automatically select suitable visual aids when generating navigation directions.

However, not every visual aid is visible at all times. For example, some street signs may be brightly illuminated at night but may be generally unnoticeable during the day. On the other hand, a building sign or billboard may be easy to notice during the day but may be poorly illuminated and accordingly unnoticeable at night.

SUMMARY

To assist the user in navigation, a sign visibility indicator system obtains a set of navigation directions for navigating a user from a starting location to a destination location. Then for each navigation instruction, the sign visibility indicator system identifies the visual aid which is included in the navigation instruction for assisting the user in identifying the location or intersection for a maneuver. For example, if the navigation instruction is "Turn right on ABC Road," the sign visibility indicator system identifies the ABC Road street sign as the visual aid. In another example, if the navigation instruction is "Turn right at the intersection adjacent to the Burger King®," the sign visibility indicator system identifier the Burger King® sign as the visual aid.

The sign visibility indicator system then determines the amount of visibility for the visual aid. For example, the sign visibility indicator system may generate a visibility metric for the visual aid based on objects occluding the visual aid, the size of the visual aid, an amount of lighting for the visual aid, a time of day, a time of year, weather conditions, a familiarity metric for the visual aid, a type of maneuver being performed at the location corresponding to the visual aid, etc. The sign visibility indicator system may identify at least some of these factors for determining the visibility metric by obtaining three-dimensional (3D) panoramic street-level imagery of a geographic area that includes the visual aid. The sign visibility indicator system may then analyze the street-level imagery to identify objects occluding the visual aid, the size of the visual aid, the amount of lighting for the visual aid, etc.

In some implementations, the sign visibility indicator system may identify the direction in which the user is traveling when approaching the visual aid based on the navigation directions. The sign visibility indicator system may then generate the visibility metric for the identified direction. For example, the sign visibility indicator system may obtain 3D panoramic street level-imagery of the geographic area that includes the visual aid from a perspective of a virtual camera having an orientation matching the orientation of the user when approaching the visual aid.

In any event, the sign visibility indicator system may generate a description of the visibility of the visual aid to include in the navigation instruction. For example, the description may be, "This sign is partly behind a tree and is difficult to see," or "There is no streetlight at your turn and the sign is small, so slow down early." In some implementations, the sign visibility indicator system generates a description of visibility for a subset of the navigation instructions included in the set of navigation directions. For example, the sign visibility indicator system may generate a description of visibility for a visual aid when the visibility metric is below a first threshold or above a second threshold to provide additional detail to the user when the visual aid is particularly noticeable or when the visual aid is particularly difficult to see.

The sign visibility indicator system may then present the set of navigation instructions to the user including at least one description of the visibility of a visual aid. In this manner, the navigation directions are improved by providing additional detail to assist the user in traversing a route. As a result, the sign visibility indicator system reduces the likelihood of errors in navigation, such as wrong turns.

An example embodiment of these techniques is a method for providing navigation instructions with indications of visibility of visual aids during navigation. The method includes receiving a request from a user for navigation directions from a starting location to a destination location and obtaining a set of navigation directions for traversing from the starting location to the destination location along a route in response to the request. The set of navigation directions includes one or more maneuvers at corresponding locations along the route. For at least one maneuver, the method includes identifying a visual aid for assisting the user in identifying a location corresponding to the maneuver, determining an amount of visibility for the visual aid, and adjusting a navigation instruction in the set of navigation directions corresponding to the maneuver to include a description of the amount of visibility for the visual aid. The method further includes providing the set of navigation directions including the adjusted navigation instruction for presentation to the user.

Another example embodiment of these techniques is a computing device for providing navigation instructions with indications of visibility of visual aids during navigation. The computing device includes one or more processors and a computer-readable memory (optionally, a non-transitory computer-readable memory) coupled to the one or more processors and storing instructions thereon. When executed by the one or more processors, the instructions cause the computing device to receive a request from a user for navigation directions from a starting location to a destination location and obtain a set of navigation directions for traversing from the starting location to the destination location along a route in response to the request. The set of navigation directions includes one or more maneuvers at corresponding locations along the route. For at least one maneuver, the instructions cause the computing device to identify a visual aid for assisting the user in identifying a location corresponding to the maneuver, determine an amount of visibility for the visual aid, and adjust a navigation instruction in the set of navigation directions corresponding to the maneuver to include a description of the amount of visibility for the visual aid. The instructions further cause the computing device to provide the set of navigation directions including the adjusted navigation instruction for presentation to the user.

Yet another example embodiment of these techniques is a method for presenting navigation instructions with indications of visibility of visual aids during navigation. The method includes receiving a request from a user for navigation directions from a starting location to a destination location, and obtaining a set of navigation directions for traversing from the starting location to the destination location along a route in response to the request. The set of navigation directions include one or more maneuvers at corresponding locations along the route, where at least one navigation instruction includes a visual aid for assisting the user in identifying a location corresponding to a maneuver included in the navigation instruction and a description of an amount of visibility for viewing the visual aid. The method further includes presenting the set of navigation directions including presenting the at least one navigation instruction having the description of the amount of visibility for the visual aid.

BRIEF DESCRIPTION OF THE DRAWINGS

FIG. 2 is an example visual aid data table included in a visual aid database, which can be implemented in the system of FIG. 1;

DETAILED DESCRIPTION

Overview

Generally speaking, the techniques for providing indications of visibility of visual aids during navigation can be implemented in one or several client devices, one or several network servers, or a system that includes a combination of these devices. However, for clarity, the examples below focus primarily on an embodiment in which a client device transmits a request for navigation directions from a starting location to a destination location to a server device. The server device then obtains a set of navigation directions including maneuvers at corresponding locations along a route. For each maneuver, the set of navigation directions may include a visual aid such as a street sign or building sign for assisting the user in identifying the intersection for performing the maneuver.

The server device may then obtain determine the amount of visibility of the visual aid, for example from the direction the user will be facing when viewing the visual aid according to the navigation directions. For example, the server device may generate a visibility metric for the visual aid based on objects occluding the visual aid, the size of the visual aid, an amount of lighting for the visual aid, a time of day, a time of year, weather conditions, a familiarity metric for the visual aid, a type of maneuver being performed at the location corresponding to the visual aid, etc.

For one or several maneuvers, the server device may generate a description of the visibility of the visual aid to include in a corresponding navigation instruction based on the determined amount of visibility. The server device then provides the set of navigation directions including a description of the visibility of a visual aid to the client device for presentation to the user.

Example Hardware and Software Components

Figure 1:
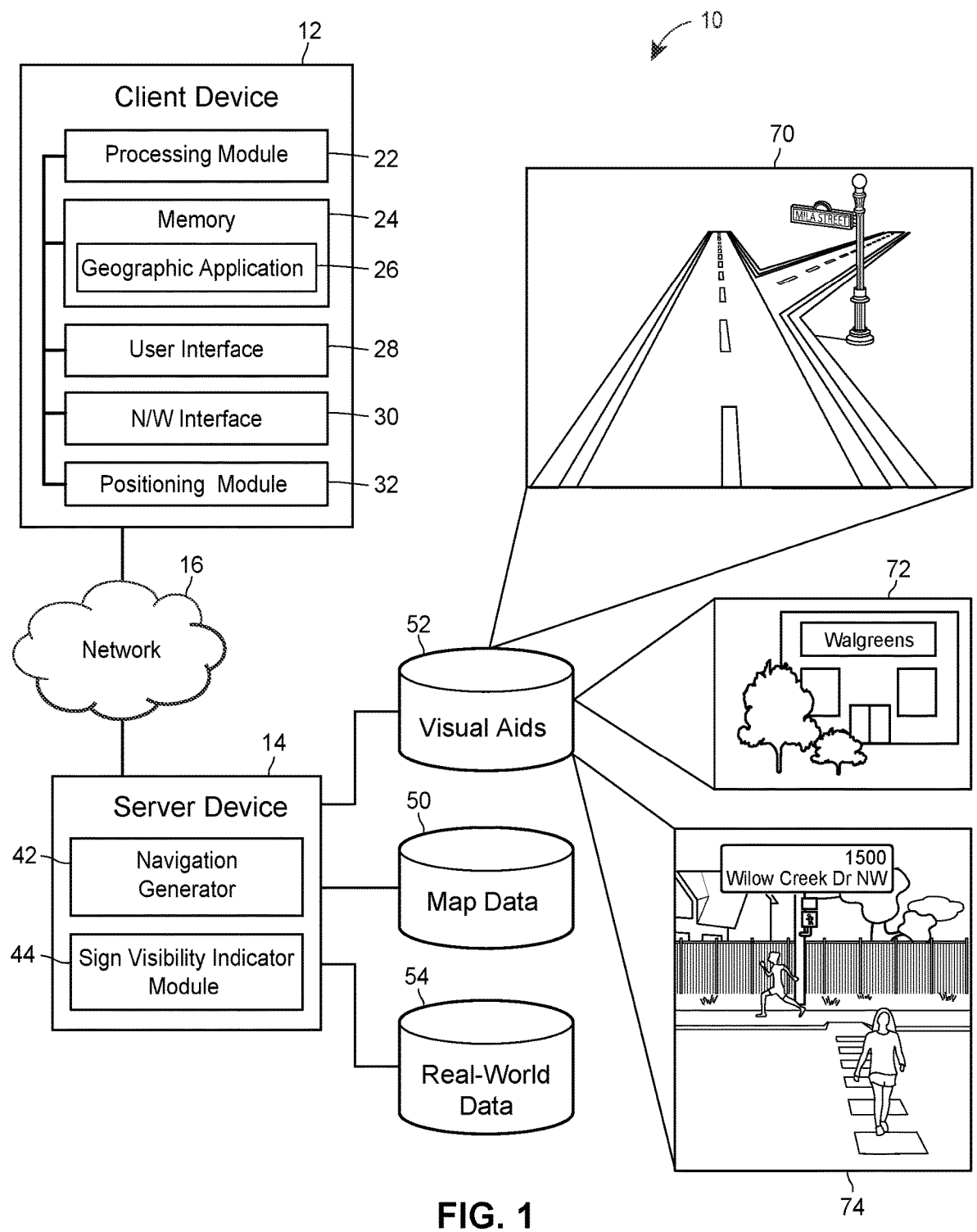
FIG. 1 is a block diagram of an example communication system in which client and server devices can operate to implement the sign visibility indicator system.

FIG. 1 illustrates an environment 10 in which at least some of the techniques for providing descriptions of visibility of visual aids in navigation can be implemented. The environment 10 includes a client device 12 and a server device 14 interconnected via a communication network 16. The network 16 may be a public network, such as the Internet, or a private network such as an intranet. The server device 14 in turn can communicate with various databases and, other server devices such as a navigation server, a map data server, a live traffic server, a weather server, etc.

The server device 14 can be communicatively coupled to a database 52 that stores visual aids and geographic information for each visual aid, such as the location and height of the visual aid, the orientation that the visual aid faces, the size of the visual aid, the appearance of the visual aid, the name of the visual aid, etc. This is described in more detail below with reference to FIG. 2. The server device 14 can also be communicatively coupled to a map database 50 and a real-world imagery database 54 storing real-world imagery for various geographic areas.

The client device 12 can include a portable electronic device such as a smartphone, a wearable device such as a smartwatch or a head-mounted display, or a tablet computer. The client device 12 may include a processing module 22, which can include one or more central processing unit (CPUs), one or more graphics processing unit (GPUs) for efficiently rendering graphics content, an application-specific integrated circuit (ASIC), or any other suitable type of processing hardware. Further, the client device 12 can include a memory 24 made up of persistent (e.g., a hard disk, a flash drive) and/or non-persistent (e.g., RAM) components. In the example implementation illustrated in FIG. 1, the memory 24 stores instructions that implement a geographic application 26, which also can be referred to as "mapping application 26."

Further, the client device 12 includes a camera (not shown), a user interface 28, and a network interface 30. In either case, the user interface 28 can include one or more input components such as a touchscreen, a microphone, a keyboard, etc. as well as one or more output components such as a screen or speaker.

The network interface 30 can support short-range and/or long-range communications. For example, the network interface 30 can support cellular communications, personal area network protocols such as IEEE 802.11 (e.g., Wi-Fi) or 802.15 (Bluetooth). In some implementations, the client device 12 includes multiple network interface modules to interconnect multiple devices within a client device 12 and to connect the client device 12 to the network 16.

Further, the network interface 30 in some cases can support geopositioning. For example, the network interface 30 can support Wi-Fi trilateration. In other cases, the client device 12 can include a dedicated positioning module 32 such as a GPS module. The client device 12 also can include other sensors such as an accelerometer, a gyroscope, a magnetometer such as a compass, etc.

With continued reference to FIG. 1, the client device 12 can communicate with the server device 14 via the network 16, which can be a wide-area network such as the Internet. The server device 14 can be implemented in one more server devices, including devices distributed over multiple geographic locations. The server device 14 can implement a navigation instructions generator 42, and a sign visibility indicator module 44. The components 42-44 can be implemented using any suitable combination of hardware, firmware, and software. The server devices can access databases such as a map database 50, a visual aid database 52, and a real-world imagery database 54, which can be implemented using any suitable data storage and access techniques.

In operation, the sign visibility indicator module 44 can receive a request for navigation directions from a client device 12. The sign visibility indicator module 44 may obtain a set of navigation directions for traveling along a route from a starting location to a destination location, for example from the navigation generator 42. The sign visibility indicator module 44 may then identify the street names, buildings, or other landmarks included in the set of navigation directions as visual aids. Then the sign visibility indicator module 44 may determine the amount of visibility for viewing the visual aids from the perspective of the user approaching the visual aids from various locations along the route. More specifically, the sign visibility indicator module 44 may retrieve 3D panoramic street-level imagery of geographic areas that include the visual aids from the real-world database 54. The sign visibility indicator module 44 may analyze the street-level imagery to identify objects occluding the visual aid, the size of the visual aid, an amount of lighting for the visual aid, etc., and store the results of the analysis in the visual aid database 52. The sign visibility indicator module 44 may then generate a description of the visibility of the visual aid.

The visual aid database 52 can store information regarding prominent geographic entities that can be visible when driving (or bicycling, walking, or otherwise moving along a navigation route) and thus serve as visual aids. For example, the visual aid database 52 can store geographic information for visual aids, such as geographic information for a Mila Street sign 70, a Walgreens® sign 72 in Denver, a Willow Creek Dr. street sign 74, and any other suitable visual aids.

For each visual aid, the visual aid database 52 can store one or several photographs, two-dimensional or three-dimensional geographic coordinates, the height of the visual aid, the orientation that the visual aid faces, the size of the visual aid, the appearance of the visual aid, the name of the visual aid, etc. To populate the visual aid database 52, the server device 14 can receive satellite imagery, photographs and videos submitted by various users, street-level imagery collected by cars equipped with specialized panoramic cameras, street and sidewalk imagery collected by pedestrians and bicyclists, etc., for example from the real-world database 54. Similarly, the visual aid database 52 can receive descriptions of visual aids from various sources such as operators of the server device 14 and people submitting user-generated content.

The sign visibility indicator module 44 may then identify objects within the street-level imagery, such as street signs, building signs, poles, street lights, trees, buildings, roads, vehicles, etc. Then the sign visibility indicator module 44 may compare the locations of the objects to the location of the visual aid to identify objects occluding the visual aid. The sign visibility indicator module 44 may identify the objects using object recognition techniques, semantic segmentation, and/or machine learning techniques. More specifically, the sign visibility indicator module 44 may obtain image data for several template objects from a database as training data for training a machine learning model, where the object types for the objects are known. The template objects may have different object types, such as a street sign, building sign, pole, street light, tree, building, road, vehicle, etc.

The sign visibility indicator module 44 may identify visual features of each of the template objects. The features of the template object may include the geometry of the edges of the template object, RGB pixel values or colors within the template object, changes in RGB pixel values at adjacent locations within the template object, etc. These features may be identified by detecting stable regions within the template object that are detectable regardless of blur, motion, distortion, orientation, illumination, scaling, and/or other changes in camera perspective. The stable regions may be extracted from the template object using a scale-invariant feature transform (SIFT), speeded up robust features (SURF), fast retina keypoint (FREAK), binary robust invariant scalable keypoints (BRISK), or any other suitable computer vision techniques. In some implementations, keypoints may be located at high-contrast regions of the template object, such as edges within the template object. A bounding box may be formed around a keypoint and the portion of the template object created by the bounding box may be a feature.

The machine learning model may be generated based on the features of the template objects corresponding to different object types, such as street signs, building signs, poles, street lights, trees, buildings, roads, vehicles, etc. The machine learning model may include a set of features for each type of object, such as a first set of features for a sign, a second set of features for a building, a third set of features for a street light, a fourth set of features for a tree, a fifth set of features for a road, a sixth set of features for a vehicle, etc. For example, the colors of an object may be stored as template features along with the width of the object, a color gradient of the object, and/or other visual features of the object.

Then the sign visibility indicator module 44 may obtain image data for a portion of the street-level imagery corresponding to an object or objects and identify features of the object or objects using similar techniques as described above. The sign visibility indicator module 44 may compare the features identified for an object within the street-level imagery using image classification and/or machine learning techniques. The machine learning techniques may include linear regression, polynomial regression, logistic regression, random forests, boosting, nearest neighbors, Bayesian networks, neural networks, support vector machines, or any other suitable machine learning technique. Each of the template features from the machine learning model may be compared to the features for an object.

In some embodiments, the template features may be compared to the features for an object using a nearest neighbors algorithm. The nearest neighbors algorithm may identify template features which are the closest to the features of the object by creating numerical representations of the features to generate feature vectors, such as a pixel width and height of an object, RGB pixel values for the object, color gradients within the object, etc. The numerical representations of the features or feature vectors of the object may be compared to the feature vectors of template objects to determine a vector distance between the features of the object and each template object. The sign visibility indicator module 44 may then determine the object type for an object based on the amount of similarity, or the vector distance in the nearest neighbors algorithm, between the features for the object and the features for template objects that represent a particular object type. For example, for an object in the street-level imagery, the sign visibility indicator module 44 may identify the top three template objects having the closest template feature vectors to the feature vectors for the object. If a majority of the one or more identified template objects is a street sign, the sign visibility indicator module 44 may identify the object in the street-level imagery as a street sign. The sign visibility indicator module 44 may repeat this process for multiple objects within the street-level imagery.

Then the server device 14 may compare the locations of the objects to the location of the visual aid to identify objects occluding the visual aid. The sign visibility indicator module 44 may also identify street light objects within the street-level imagery and compare the locations of the street light objects to the location of the visual aid to determine the amount of lighting for the visual aid. Additionally, the sign visibility indicator module 44 may compare the locations of other objects related to lighting to the location of the visual aid to determine the amount of lighting for the visual aid.

In any event, the server device 14 may generate an occlusion metric for a visual aid based on the objects occluding the visual aid and/or the locations of the objects relative to the location of the visual aid. For example, a tree may partially occlude a visual aid by covering a bottom portion of a street sign which may result in a lower occlusion metric than a building which fully occludes a visual aid. The server device 14 may also generate a visibility metric for the visual aid based on any suitable combination of the occlusion metric for the visual aid, the size of the visual aid, the height of the visual aid, the location of the visual aid, the orientation that the visual aid faces, an amount of lighting for the visual aid, a time of day, a time of year, weather conditions, a familiarity metric for the visual aid, a type of maneuver being performed at the location corresponding to the visual aid, etc.

For example, the visibility metric may be inversely related to the occlusion metric in that visibility decreases as the occlusion metric increases indicating a higher level of occlusion of the visual aid. Furthermore, the visibility metric may be reduced based on foggy, rainy, cloudy, or snowy weather conditions whereas the visibility metric may increase during sunny and clear weather conditions.

Still further, the visibility metric may be adjusted based on the lighting level metric, the time of day, and the time of year. During the daytime, as determined based on the time of day and/or the time of year, the visibility metric may be higher than during the nighttime. However, the visibility metric may increase during the nighttime as the lighting level increases. The lighting level metric may also be dependent on the time of day and/or time of year as a business sign may be lit up during store hours but turned off after the store closes.

Moreover, the visibility metric may be adjusted based on the location of the visual aid, the orientation that the visual aid faces, and the type of maneuver being performed at the location corresponding to the visual aid. For example, if the visual aid is to the left of the user but the type of maneuver is a right turn, the visibility metric may be decreased due to the difficulty in viewing an object that is away from the direction of the maneuver.

A data table 200 including an example index of geographic information for each visual aid included in the visual aid database 52 is illustrated in FIG. 2. The geographic information for each visual aid may then be used to generate a visibility metric for the visual aid and/or a description of the visibility of the visual aid.

For each landmark, the data table 200 includes a visual aid identifier 202, a location of the visual aid 204 including two-dimensional or three-dimensional geographic coordinates and the height of the visual aid, the orientation that the visual aid faces 206, the size or dimensions of the visual aid 208, a textual description of the appearance of the visual aid 210, the name of the visual aid 212, and an occlusion metric 214 for the visual aid indicating whether objects occlude the visual aid and the extent to which the objects occlude the visual aid. For example, the occlusion metric 214 may be a score from 1-100, where a score of 1 indicates that there is a clear line of sight to the visual aid and that there are not any objects which occlude the visual aid. A score of 100 indicates that the visual aid is fully occluded by other objects such as a building or trees, and a score in between 1 and 100 may indicate that the visual aid is partially occluded.

The data table 200 may also include a familiarity metric (not shown) for the visual aid indicating the amount of familiarity or popularity of a particular visual aid. For example, McDonald's® may have a high familiarity metric based on the number of people who are familiar with and can recognize a McDonald's restaurant. On the other hand, a local business may have a lower familiarity metric. Visual aids having higher familiarity metrics may have higher visibility as they can be recognized from further away.

Additionally, the data table 200 may include a lighting level metric (not shown) for the visual aid indicating the amount of light present at the visual aid. The lighting level metric may be higher for visual aids proximate to street lights or having brightly lit signs than for visual aids which are not proximate to street lights or which have dimly lit signs. The lighting level metric may change based on the time of day. For example, a business sign may be lit up during store hours but turned off after the store closes.

Accordingly, the lighting level metric for the business sign may be higher during store hours than during the time in which the store is closed.

For example, the first entry of the data table 200 includes geographic information for a Walgreens® sign. According to the data table 200, the Walgreens® sign is located at a height of 5 m and faces east. The Walgreens® sign is 4 m wide and 2 m long and includes white cursive letters with a red background. The occlusion metric for the Walgreens® sign is 95 on a scale of 1-100 indicating that the sign is occluded for example by other buildings, trees, etc.

The occlusion metric for a visual aid can be determined, for instance, by accessing a three-dimensional model associated with the geographic area where the visual aid is located. The model can include a three-dimensional representation of the visual aid. In one implementation, the three-dimensional model can be a stereo mesh model of the geographic area that includes a plurality of mesh triangles associated with the visual aid. The model can also include or can have access to synthetic models of geographic features or other landmarks in the geographic area, such as the synthetic models provided in a virtual globe application. The model can also include textures mapped to the surfaces in the three-dimensional models. The textures can include photographs or other imagery associated with the geographic area, and can depict geographic objects such as trees (with or without leaves), bridge trestles, and other structures that can occlude the visibility of visual aids in the geographic area.

Figure 3:
FIG. 3 is example three-dimensional (3D) panoramic street-level imagery of a geographic area that includes a visual aid, which can be analyzed in the system of FIG. 1 to determine visibility of the visual aid.

FIG. 3 illustrates example 3D panoramic street-level imagery 300 of a geographic area that includes a visual aid 302 (Joe's Restaurant). The server device 14 analyzes the street-level imagery 300 using object recognition and/or semantic segmentation techniques to identify objects within the street-level imagery 300 and determine the object type of each object. For example, the server device 14 analyzes the street-level imagery 300 to identify a street sign 302 for the visual aid, a power line 304, and a street light 306. The server device 14 then determines the positions of each object 302-306 within the street-level imagery. For example, the server device 14 may determine the positions of each object 302-306 within the real-world imagery by identifying a view frustum of a virtual camera depicting the street-level imagery and mapping locations in the view frustum to pixels within the street-level imagery. The server device 14 may then compare the positions of the objects 304, 306 to the position of the business sign object 302 to determine the extent to which the objects 304, 306 occlude the business sign object 302. Here, it does not appear that any objects occlude the business sign object 302 and accordingly, the occlusion metric for the business sign object 302 may be a score of 1 on a scale of 1-100 or may otherwise indicate that the business sign object 302 is not occluded. Additionally, the server device 14 may compare the positions of the objects 304, 306 to the position of the business sign object 302 to determine the lighting level of the business sign object 302. In this scenario, the street light 306 is not proximate to the business sign object 302 which may result in a low lighting level metric for the business sign object 302. The server device 14 may also determine whether the business sign object 302 has its own lighting (e.g., the business sign is a neon sign) and may adjust the lighting level metric accordingly.

Still further, the server device 14 may generate separate occlusion and/or lighting level metrics for a visual aid from different orientations for viewing the visual aid. For example, if the user is traveling east when viewing the visual aid, the server device 14 may generate an occlusion and/or lighting level metric for viewing the visual aid from the east. To generate the separate occlusion and/or lighting level metrics, the server device 14 may obtain 3D panoramic street-level imagery of a visual aid from multiple perspectives of virtual cameras having multiple orientations or locations. The server device 14 may then analyze the 3D panoramic street-level imagery of the visual aid from the perspective of a virtual camera having an orientation corresponding to the orientation the user is facing when approaching the visual aid to determine the occlusion and/or lighting level metrics for the visual aid.

Figure 4:
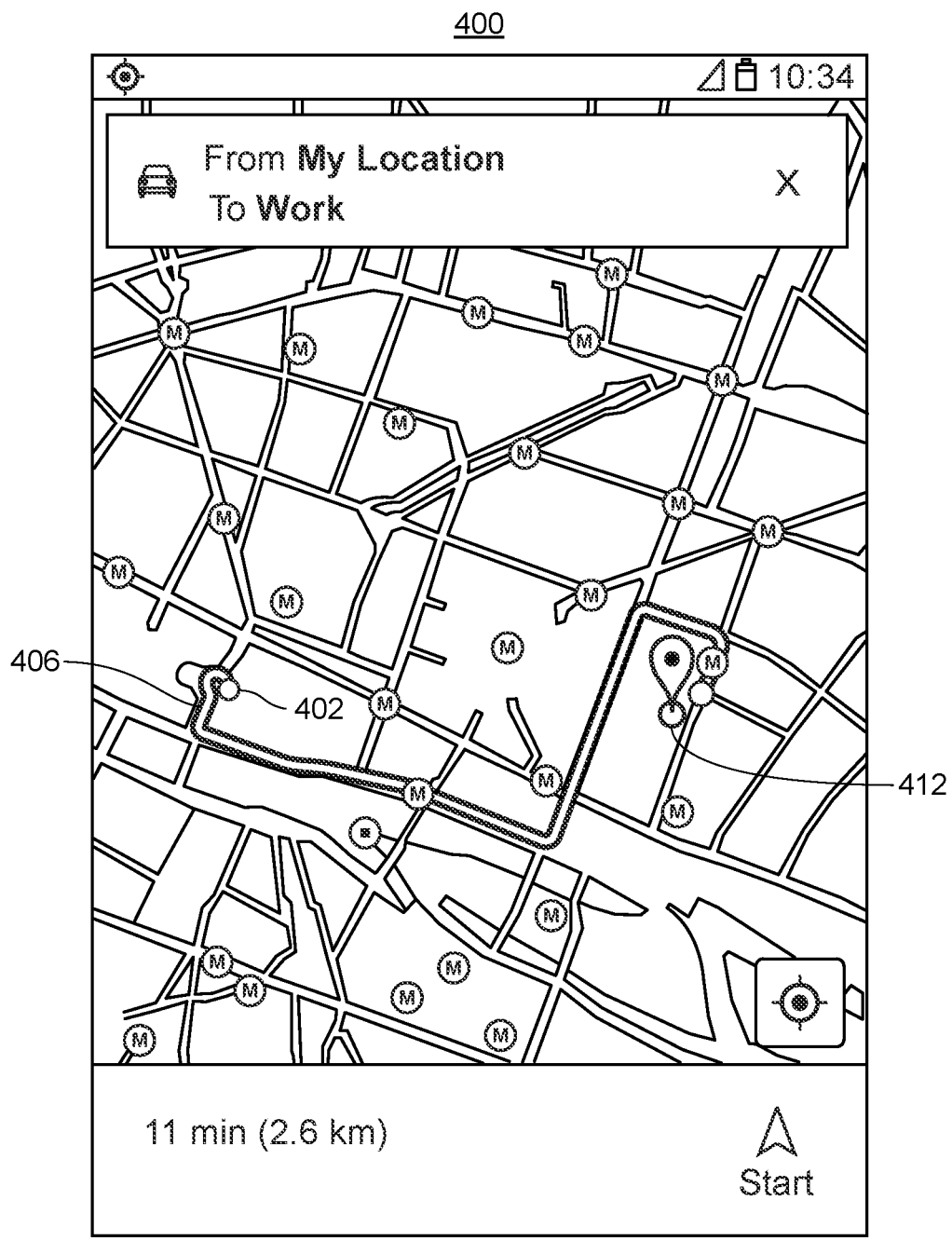
FIG. 4 is an example navigation display of a route, which can be analyzed in the system of FIG. 1 to determine the direction the user is traveling in when approaching a visual aid.

To determine the orientation the user is facing when approaching the visual aid, the server device 14 may analyze the set of navigation directions to determine the direction the user is traveling along the route as the user approaches the visual aid. FIG. 4 illustrates an example display 400 of a route 406 from a starting location 402 to a destination location 412. The server device 14 may analyze the locations along the route 406 and/or maneuvers to determine the direction the user is traveling when approaching the visual aid. Then the server device 14 may obtain the 3D panoramic street-level imagery of the visual aid from the perspective of a virtual camera having an orientation corresponding to the orientation the user is facing when approaching the visual aid to determine the occlusion and/or lighting level metrics for the visual aid.

In any event, the server device 14 may use the geographic information for each visual aid, including photographs of the visual aid, two-dimensional or three-dimensional geographic coordinates for the visual aid, the height of the visual aid, the orientation that the visual aid faces, a type of maneuver being performed at the location corresponding to the visual aid, the size of the visual aid, the occlusion metric for the visual aid, the lighting level metric for the visual aid, the familiarity metric for the visual aid, etc., for various weather conditions and/or at various times of day to generate a visibility metric for the visual aid, for example from the orientation in which the user will be approaching the visual aid according to the navigation directions.

The server device 14 may then generate a description of the amount of visibility at the visual aid in accordance with the visibility metric. The description of the amount of visibility at the visual aid may include a description of the lighting level for viewing the visual aid in accordance with the lighting level metric, a description of the object(s) occluding the visual aid in accordance with the occlusion metric, a description of the size of the visual aid, a description of the location of the visual aid in relation to the user (e.g., "The street sign is on the right side of the street"), or any other suitable description of the amount of visibility at the visual aid. Furthermore, the description of the amount of visibility at the visual aid may include a recommendation based on the amount of visibility at the visual aid, such as "Slow down early."

More specifically, when the visibility metric for a visual aid is below a first threshold for example, the server device 14 may generate a description indicating there is low visibility of the visual aid. When the visibility metric for the visual aid is above the first threshold but below a second threshold, the server device 14 may generate a description indicating there is partial visibility of the visual aid. When the visibility metric for the visual aid is above the second threshold, the server device 14 may generate a description indicating there is high visibility of the visual aid. In another example, when the visibility metric for a visual aid is below a threshold visibility metric and the size of the visual aid is below a threshold size, the server device 14 may generate a description indicating there is low visibility of the visual aid because the visual aid is small. In yet another example, when the visibility metric for a visual aid is below a threshold visibility metric and the lighting level metric for the visual aid is below a threshold lighting level metric, the server device 14 may generate a description indicating there is low visibility of the visual aid because the visual aid is poorly lit. In another example, when the visibility metric for a visual aid is below a threshold visibility metric and the occlusion metric for the visual aid is below a threshold occlusion metric, the server device 14 may generate a description indicating there is low visibility of the visual aid because the visual aid is occluded or at least partially occluded, and may describe the object(s) occluding the visual aid.

In some implementations, the server device 14 may generate visibility descriptions for a subset of the visual aids in the set of navigation directions. For example, the server device 14 may generate a visibility description for at least one visual aid having a visibility metric above a first threshold or below a second threshold. In this manner, the navigation directions may provide additional detail to the user for a visual aid that is particularly noticeable or particularly difficult to see. In another example, the server device 14 may rank the visual aids within the set of navigation directions in accordance with their respective visibility metrics. The server device 14 may then select visual aids ranked above a threshold ranking (e.g., the top three ranked visual aids), and may generate visibility descriptions for the selected visual aids.

Figure 5:
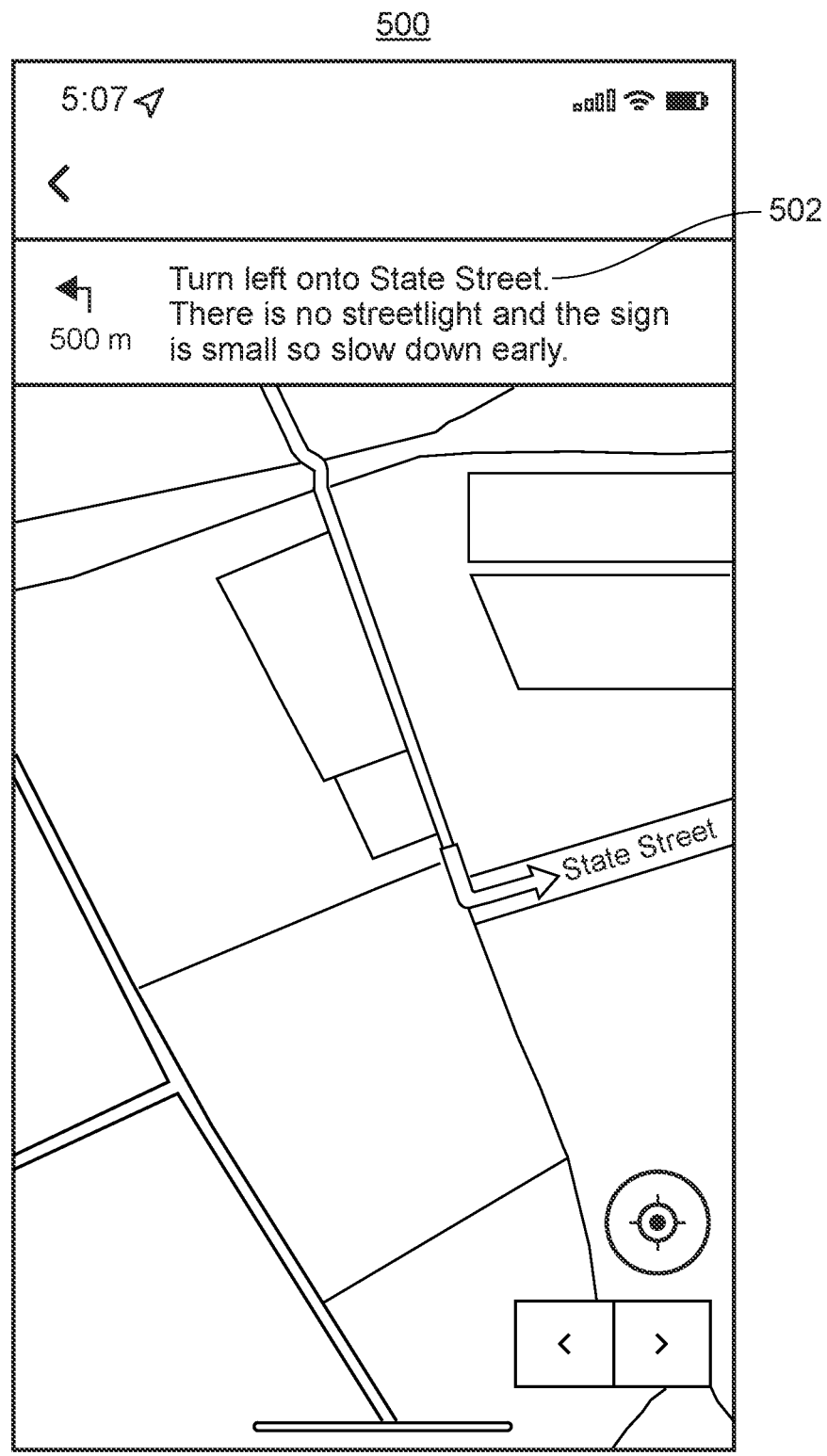
FIG. 5 is an example navigation display presented on a client device including a navigation instruction having a description of the visibility of a visual aid.

In any event, the server device 14 then provides the set of navigation directions for display on the client device 12, including one or more navigation instructions having a description of the amount of visibility of a visual aid for assisting the user in performing the navigation instruction. FIG. 5 illustrates an example navigation display 500 presented on the user's client device 12. The navigation display 500 includes a navigation instruction directing the user to perform a maneuver ("Turn left") and referring to a visual aid (the State Street sign) for assisting the user in identifying the location for performing the maneuver (the intersection where the user approaches State Street). The navigation instruction also includes a textual description of the amount of visibility of the visual aid 502 (e.g., "There is no streetlight and the sign is small so slow down early."). In addition to providing a textual description, the client device 12 may present an audio description of the amount of visibility of a visual aid for example, via the speakers of the client device 12.

Figure 6:
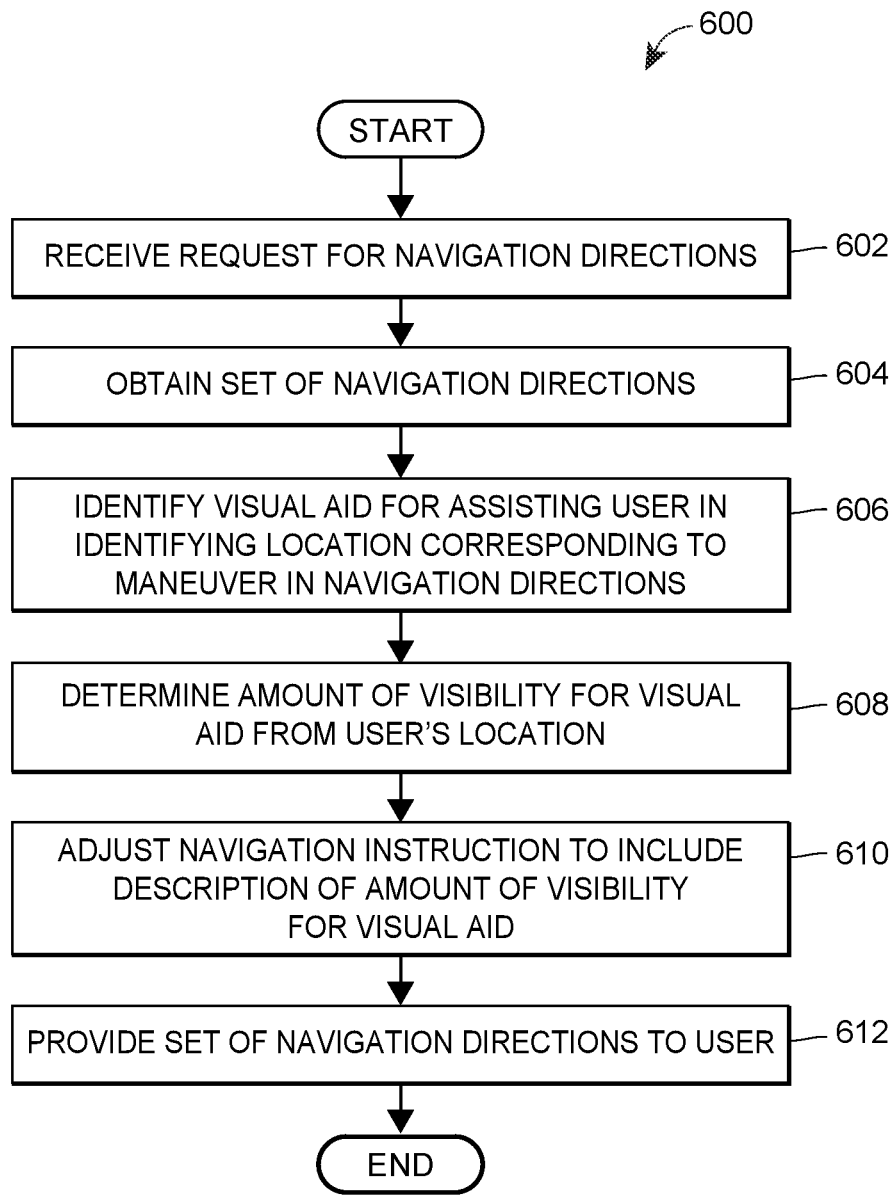
FIG. 6 is a flow diagram of an example method for providing navigation instructions with indications of visibility of visual aids during navigation, which can be implemented in a server device.

Example Methods for Providing Indications of
Visibility of Visual Aids During Navigation FIG. 6 illustrates a flow diagram of an example method 600 for providing navigation instructions with indications of visibility of visual aids during navigation. The method can be implemented in a set of instructions stored on a computer-readable memory and executable at one or more processors of the server device 14. For example, the method can be implemented by the navigation instructions generator 42 and/or sign visibility indicator module 44.

At block 602, a request is received for navigation directions from a starting location to a destination location. In response to receiving the request, the server device 14 may obtain a set of navigation directions via the navigation instructions generator 42 for traveling along a route to the destination location (block 604). The set of navigation directions may include maneuvers at corresponding locations along the route, such as turn left, turn right, continue straight, etc. To assist the user in identifying the locations for performing the maneuvers, the set of navigation directions may refer to visual aids, such as street signs, building signs, etc., proximate to the locations for performing the maneuvers.

At block 606, the server device 14 identifies a visual aid referred to in the set of navigation directions for assisting the user in identifying a location for performing a maneuver. The server device 14 then determines the amount of visibility for viewing the visual aid (block 608). More specifically, the server device 14 may retrieve 3D panoramic street-level imagery of a geographic area that includes the visual aid from the real-world database 54. In some implementations, the server device 14 may retrieve 3D panoramic street-level imagery which is from the perspective of a virtual camera having an orientation corresponding to the orientation the user is facing when approaching the visual aid. To determine the orientation the user is facing when approaching the visual aid, the server device 14 may analyze the set of navigation directions to determine the direction in which the user is traveling along the route as the user approaches the visual aid. For example, if the previous navigation instruction before the navigation instruction referring to the visual aid is to turn left onto Main Street which results in the user heading east, the server device 14 may determine that the user approaches the visual aid from the west while facing east.

In any event, the server device 14 analyzes the 3D panoramic street-level imagery to identify objects occluding the visual aid, the size of the visual aid, an amount of lighting for the visual aid, etc., and may store the results of the analysis in the visual aid database 52. The server device 14 may then determine the amount of visibility of the visual aid based on any suitable combination of the height of the visual aid, the location of the visual aid, the orientation that the visual aid faces, the size of the visual aid, a type of maneuver being performed at the location corresponding to the visual aid, an occlusion metric for the visual aid, a lighting level metric for the visual aid, a familiarity metric for the visual aid, weather conditions at the visual aid, the time of day, the time of year, etc.

At block 610, the server device 14 adjusts the navigation instruction to include a description of the amount of visibility for the visual aid. The description of the amount of visibility at the visual aid may include a description of the lighting level for viewing the visual aid in accordance with the lighting level metric, a description of the object(s) occluding the visual aid in accordance with the occlusion metric, a description of the size of the visual aid, a description of the location of the visual aid in relation to the user (e.g., "The street sign is on the right side of the street"), or any other suitable description of the amount of visibility at the visual aid. Furthermore, the description of the amount of visibility at the visual aid may include a recommendation based on the amount of visibility at the visual aid, such as "Slow down early."

In some implementations, the server device 14 may generate visibility descriptions for a subset of the visual aids in the set of navigation directions. For example, the server device 14 may generate a visibility description for at least one visual aid having a visibility metric above a first threshold or below a second threshold. In this manner, the navigation directions may provide additional detail to the user for a visual aid that is particularly noticeable or particularly difficult to see. In another example, the server device 14 may rank the visual aids within the set of navigation directions in accordance with their respective visibility metrics. The server device 14 may then select visual aids ranked above a threshold ranking (e.g., the top three ranked visual aids), and may generate visibility descriptions for the selected visual aids.

In any event, the server device 14 then provides the set of navigation directions including one or more navigation instructions having a description of the amount of visibility of a visual aid for assisting the user in performing the navigation instruction for display on the client device 12 (block 612).

Figure 7:
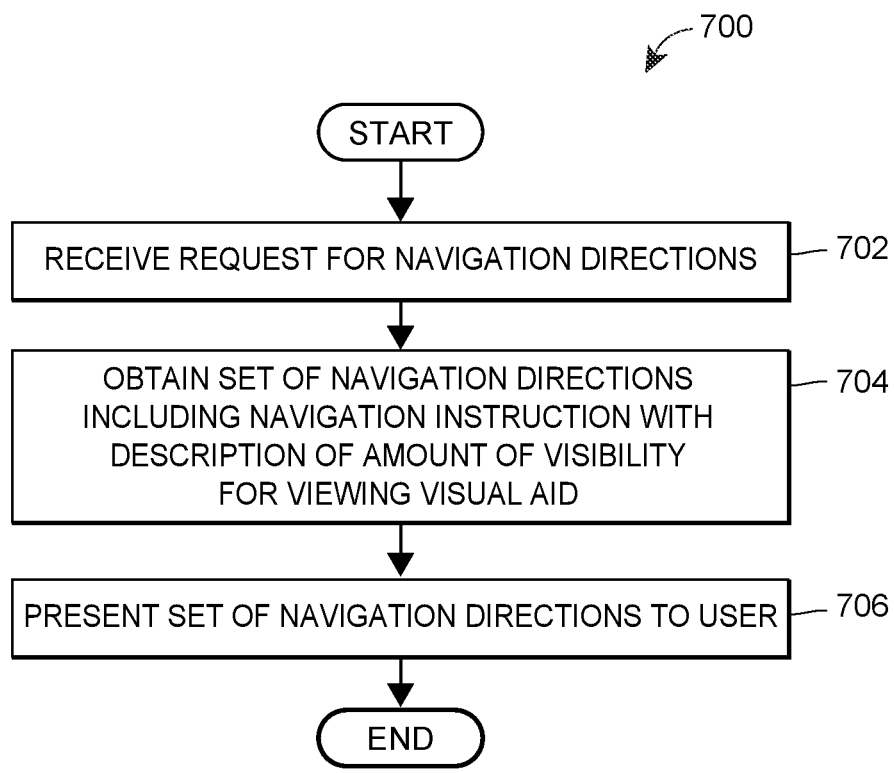
FIG. 7 is a flow diagram of an example method for presenting navigation instructions with indications of visibility of visual aids during navigation, which can be implemented in a client device.

FIG. 7 illustrates a flow diagram of an example method 700 for presenting navigation instructions with indications of visibility of visual aids during navigation. The method can be implemented in a set of instructions stored on a computer-readable memory and executable at one or more processors of the client device 12. For example, the method can be implemented by the geographic application 26.

At block 702, a request is received for navigation directions from a starting location to a destination location. In response to receiving the request, the client device 12 may obtain a set of navigation directions for traveling along a route to the destination location (block 704). For example, the client device 12 may transmit the request to a server device 14 and may receive the set of navigation directions from the server device 14. The set of navigation directions may include maneuvers at corresponding locations along the route, such as turn left, turn right, continue straight, etc. To assist the user in identifying the locations for performing the maneuvers, the set of navigation directions may refer to visual aids, such as street signs, building signs, etc., proximate to the locations for performing the maneuvers. Additionally, the set of navigation directions may include one or more navigation instructions having a description of the amount of visibility for viewing the visual aid referred to in the navigation instruction.

The description of the amount of visibility at the visual aid may include a description of the lighting level for viewing the visual aid, a description of the object(s) occluding the visual aid, a description of the size of the visual aid, a description of the location of the visual aid in relation to the user (e.g., "The street sign is on the right side of the street"), or any other suitable description of the amount of visibility at the visual aid. Furthermore, the description of the amount of visibility at the visual aid may include a recommendation based on the amount of visibility at the visual aid, such as "Slow down early."

Then at block 706, the geographic application 26 may present the set of navigation directions to the user via the user interface 28 and/or speakers of the client device. The geographic application 26 may present a textual description of the amount of visibility of a visual aid and/or an audio description of the amount of visibility of the visual aid for example, via the speakers of the client device 12.

The present technique thus provides an improved interface between a user and an electronic navigation system by allowing the automatic generation of improved navigation instructions. These navigation instructions may be bespoke to a given user's situation, since, as exemplified in embodiments, the route, planned maneuvers, lighting and weather conditions, etc. of a given user may all be taken into account in determining the visibility of visual aids on the user's route. Furthermore, these improved navigation instructions may be generated automatically for any navigation route. For example, when 3D panoramic street-level images corresponding to the user's location and orientation and a suitably trained machine learning model are used, a user can obtain the benefit of improved navigation on any route for which 3D panoramic street-level images exist. This helps provide easier and safer navigation for all users.

Additional Considerations

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a cloud computing environment or as a software as a service (SaaS). For example, at least some of the operations may be performed by a group of computers (as examples of machines including processors), these operations being accessible via a network (e.g., the Internet) and via one or more appropriate interfaces (e.g., application program interfaces (APIs).)

Upon reading this disclosure, those of ordinary skill in the art will appreciate still additional alternative structural and functional designs for the systems for providing indications of visibility of visual aids during navigation. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing navigation instructions with indications of visibility of visual aids during navigation, the method comprising:
    receiving, at one or more processors, a request from a user for navigation directions from a starting location to a destination location;
    automatically generating, by the one or more processors, a set of navigation directions for traversing from the starting location to the destination location along a route in response to the request, the set of navigation directions including one or more maneuvers at corresponding locations along the route;
    for at least one maneuver:
    identifying, by the one or more processors, a visual aid for assisting the user in identifying a location corresponding to the maneuver;

determining, by the one or more processors, an amount of visibility for the visual aid; and adjusting, by the one or more processors, a navigation instruction in the set of navigation directions corresponding to the maneuver to include a description of the amount of visibility for the visual aid including at least one of: a description of an object occluding the visual aid or a recommendation based on the amount of visibility at the visual aid; and providing, by the one or more processors, the set of navigation directions including the adjusted navigation instruction for presentation to the user.

2. The method of claim 1, wherein determining an amount of visibility for the visual aid includes:

determining, by the one or more processors, an orientation of the user as the user approaches the visual aid based on the set of navigation directions; and determining, by the one or more processors, the amount of visibility for the visual aid from the orientation that the user approaches the visual aid.

3. The method of claim 1, wherein determining an amount of visibility for the visual aid includes:

obtaining, by the one or more processors, a three-dimensional panoramic street-level image of a geographic area including the visual aid; and determining, by the one or more processors, the amount of visibility for the visual aid based on objects included in the three-dimensional panoramic street-level image.

4. The method of claim 3, wherein obtaining a three-dimensional panoramic street-level image of a geographic area includes obtaining the three-dimensional panoramic street-level image from a perspective of a virtual camera having a view frustum corresponding to a location or orientation of the user as the user approaches the visual aid.

5. The method of claim 3, further comprising:

classifying, by the one or more processors, one or more portions of the three-dimensional panoramic street-level image as one or more types of objects;

determining, by the one or more processors, whether the one or more types of objects occlude the visual aid;

determining, by the one or more processors, an occlusion metric for the visual aid based on whether the one or more types of objects occlude the visual aid; and determining, by the one or more processors, the amount of visibility for the visual aid based on the occlusion metric.

6. The method of claim 5, wherein classifying one or more portions of the three-dimensional panoramic street level image as one or more types of objects includes:

training, by one or more processors, a machine learning model using (i) image data for objects included in three-dimensional panoramic street-level images, and (ii) an object type for each of the objects;

obtaining, by the one or more processors, image data for a portion of the three- dimensional panoramic street level image; and applying, by the one or more processors, the machine learning model to the image data to classify the portion of three-dimensional panoramic street level image as a particular type of object.

7. The method of claim 1, wherein determining an amount of visibility for the visual aid includes determining the amount of visibility for the visual aid based on at least one of:

a size of the visual aid,
a light level for viewing the visual aid,
a time of day,
a time of year,
weather conditions at the location for the visual aid, or
a type of maneuver being performed upon approaching the visual aid.

8. The method of claim 1, wherein adjusting a navigation instruction to include a description of the amount of visibility for the visual aid further includes:

adjusting, by the one or more processors, the navigation instruction to include a description of a lighting level for viewing the visual aid.

9. A computing device for providing navigation instructions with indications of visibility of visual aids during navigation, the computing device comprising:

one or more processors; and a non-transitory computer-readable memory coupled to the one or more processors and storing instructions thereon that, when executed by the one or more processors, cause the computing device to:

receive a request from a user for navigation directions from a starting location to a destination location;

automatically generate a set of navigation directions for traversing from the starting location to the destination location along a route in response to the request, the set of navigation directions including one or more maneuvers at corresponding locations along the route;

for at least one maneuver:

identify a visual aid for assisting the user in identifying a location corresponding to the maneuver;

determine an amount of visibility for the visual aid; and adjust a navigation instruction in the set of navigation directions corresponding to the maneuver to include a description of the amount of visibility for the visual aid including at least one of: a description of an object occluding the visual aid or a recommendation based on the amount of visibility at the visual aid; and provide the set of navigation directions including the adjusted navigation instruction for presentation to the user.

10. The computing device of claim 9, wherein to determine an amount of visibility for the visual aid, the instructions cause the computing device to:

determine an orientation of the user as the user approaches the visual aid based on the set of navigation directions; and determine the amount of visibility for the visual aid from the orientation that the user approaches the visual aid.

11. The computing device of claim 9, wherein to determine an amount of visibility for the visual aid, the instructions cause the computing device to:

obtain a three-dimensional panoramic street-level image of a geographic area including the visual aid; and determine the amount of visibility for the visual aid based on objects included in the three-dimensional panoramic street-level image.

12. The computing device of claim 11, wherein the three-dimensional panoramic street-level image of the geographic area is from a perspective of a virtual camera having a view frustum corresponding to a location or orientation of the user as the user approaches the visual aid.

13. The computing device of claim 11, wherein the instructions further cause the computing device to:

classify one or more portions of the three-dimensional panoramic street-level image as one or more types of objects;

determine whether the one or more types of objects occlude the visual aid;

determine an occlusion metric for the visual aid based on whether the one or more types of objects occlude the visual aid; and determine the amount of visibility for the visual aid based on the occlusion metric.

14. The computing device of claim 13, wherein to classify one or more portions of the three-dimensional panoramic street level image as one or more types of objects, the instructions cause the computing device to:

train a machine learning model using (i) image data for objects included in three-dimensional panoramic street-level images, and (ii) an object type for each of the objects;

obtain image data for a portion of the three-dimensional panoramic street level image; and apply the machine learning model to the image data to classify the portion of three-dimensional panoramic street level image as a particular type of object.

15. The computing device of claim 9, wherein the amount of visibility for the visual aid is determined based on at least one of:

a size of the visual aid, a light level for viewing the visual aid, a time of day, a time of year, weather conditions at the location for the visual aid, or a type of maneuver being performed upon approaching the visual aid.

16. The computing device of claim 9, wherein the navigation instruction is further adjusted to include a description of a lighting level for viewing the visual aid.

17. A method for presenting navigation instructions with indications of visibility of visual aids during navigation, the method comprising:

receiving, at one or more processors, a request from a user for navigation directions from a starting location to a destination location;

obtaining, by the one or more processors, a set of automatically generated navigation directions for traversing from the starting location to the destination location along a route in response to the request, the set of navigation directions including one or more maneuvers at corresponding locations along the route, wherein at least one navigation instruction includes a visual aid for assisting the user in identifying a location corresponding to a maneuver included in the navigation instruction and a description of an amount of visibility for viewing the visual aid including at least one of: a description of an object occluding the visual aid or a recommendation based on the amount of visibility at the visual aid; and presenting, by the one or more processors, the set of navigation directions including presenting the at least one navigation instruction having the description of the amount of visibility for the visual aid.

18. The method of claim 17, wherein presenting the set of navigation directions includes presenting the at least one navigation instruction with the description of the object occluding the visual aid.

19. The method of claim 17, wherein presenting the set of navigation directions includes presenting the at least one navigation instruction with a description of a lighting level for viewing the visual aid.

20. The method of claim 17, wherein presenting the set of navigation directions includes presenting the at least one navigation instruction with the description of the amount of visibility for viewing the visual aid from an orientation that the user approaches the visual aid.

* * * * *